United States Patent
Li et al.

(10) Patent No.: US 8,289,887 B2
(45) Date of Patent: Oct. 16, 2012

(54) LATE CALL FORWARDING METHOD IN IP MULTIMEDIA CORE NETWORK SUBSYSTEM CENTRALIZED SERVICE

(75) Inventors: Zhendong Li, Shenzhen (CN); Shilin You, Shenzhen (CN); Zhenwu Hao, Shenzhen (CN); Zhiming Yu, Shenzhen (CN); Jun Wang, Shenzhen (CN)

(73) Assignee: ZTE Corporation (CN)

(*) Notice: Subject to any disclaimer, the term of this patent is extended or adjusted under 35 U.S.C. 154(b) by 227 days.

(21) Appl. No.: 12/679,739

(22) PCT Filed: Nov. 29, 2007

(86) PCT No.: PCT/CN2007/003368
§ 371 (c)(1),
(2), (4) Date: Mar. 24, 2010

(87) PCT Pub. No.: WO2009/039688
PCT Pub. Date: Apr. 2, 2009

(65) Prior Publication Data
US 2010/0195542 A1 Aug. 5, 2010

(30) Foreign Application Priority Data
Sep. 28, 2007 (CN) .......................... 2007 1 0162956

(51) Int. Cl.
*H04B 7/00* (2006.01)
*H04L 12/66* (2006.01)
*G06F 15/16* (2006.01)

(52) U.S. Cl. ......... 370/271; 370/310; 370/352; 709/227

(58) Field of Classification Search .......... 370/254–271, 370/328–352, 389–395; 709/224–229; 455/412–445; 379/142–201, 211–229
See application file for complete search history.

(56) References Cited

U.S. PATENT DOCUMENTS

| | | | | |
|---|---|---|---|---|
| 5,579,375 A * | 11/1996 | Ginter | ........................... | 455/417 |
| 6,134,433 A * | 10/2000 | Joong et al. | ................... | 455/417 |
| 6,138,007 A * | 10/2000 | Bharatia | .................... | 455/414.1 |
| 7,346,155 B2 * | 3/2008 | Gibson | ..................... | 379/211.02 |
| 7,496,190 B1 * | 2/2009 | Kung et al. | ............. | 379/211.02 |
| 7,529,839 B2 * | 5/2009 | Varga et al. | ................... | 709/227 |
| 7,706,779 B2 * | 4/2010 | Buckley | ..................... | 455/412.1 |
| 7,720,474 B2 * | 5/2010 | Gouthama et al. | ............ | 455/433 |

(Continued)

FOREIGN PATENT DOCUMENTS

CN 101014190 A 8/2007

(Continued)

*Primary Examiner* — Man Phan
(74) *Attorney, Agent, or Firm* — Brooks Kushman P.C.

(57) ABSTRACT

A late call forwarding method in the IMS centralized service. During a call setting up, an ICCF receives a call request from the CSCF serving the called user, called session A, and the ICCF acquires a called user's roaming number and initiates a call to the called user. After receiving the call request, the VMSC serving the called user triggers the late call forwarding service according its determination. A CAMEL service is triggered when the VMSC initiates a call to the forwarding target. The VMSC exchanges messages with the ICCF and informs the ICCE about session associated information and the forwarding reason. When the ICCF determines that the forwarding is needed, it sends a response to the session A does not send the response message, after a telecom application server (TAS) receives the indication, the TAS initiates a regular forwarding service.

13 Claims, 2 Drawing Sheets

U.S. PATENT DOCUMENTS

| | | | |
|---|---|---|---|
| 7,742,763 B2 * | 6/2010 | Jiang | 455/433 |
| 8,036,210 B2 * | 10/2011 | Zhu et al. | 370/352 |
| 8,059,633 B2 * | 11/2011 | Heidermark et al. | 370/352 |
| 2006/0252425 A1 * | 11/2006 | Jiang | 455/432.1 |
| 2006/0291418 A1 * | 12/2006 | Singh | 370/331 |
| 2008/0084980 A1 * | 4/2008 | Florkey et al. | 379/201.01 |
| 2009/0219843 A1 * | 9/2009 | Chin et al. | 370/310 |
| 2009/0232128 A1 * | 9/2009 | Paulis et al. | 370/352 |
| 2010/0144344 A1 * | 6/2010 | Jiang | 455/433 |
| 2010/0254372 A1 * | 10/2010 | Keller et al. | 370/352 |

FOREIGN PATENT DOCUMENTS

| | | |
|---|---|---|
| WO | 2006125474 A1 | 11/2006 |

* cited by examiner

LATE CALL FORWARDING METHOD IN IP MULTIMEDIA CORE NETWORK SUBSYSTEM CENTRALIZED SERVICE

TECHNICAL FIELD

The present invention relates to the technology of accessing to the IP Multimedia Subsystem (IMS) via the circuit switching domain, and more especially, to a late call forwarding method in the IMS centralized service.

BACKGROUND OF THE RELATED ART

Internet Protocol Multimedia Subsystem (IMS), which is an IP-based network architecture proposed in the 3$^{rd}$ Generation Partnership Project (3GPP), constructs an open and flexible service environment, supports multimedia applications and provides abundant multimedia services for users.

IMS, which is an IP-based telecom network architecture and is independent of access technology, can provide services for mobile cellular networks such as Global System for Mobile communications (GSM) and Universal Mobile Telecommunications System (UMTS), and so on, in addition to providing services for the Packet Switching access networks such as the General Packet Radio Service (GPRS), Wireless Local Area Network (WLAN), and so on.

The mobile cellular network, such as GSM and UMTS, applies the circuit switching technology, which is called a Circuit Switching (CS) domain and able to provide basic voice services and supplementary services based on voice services for users. When accessing to the IMS, the IMS evolves into an access mode, where services are provided entirely by the IMS. Such technology is called IMS Centralized Service (ICS for short).

The IMS centralized services have the following advantages:

(1) the IMS provides uniform services for access modes, such as circuit switching domain and packet switching domain, and supports network convergence;

(2) it supports the evolution of a CS network into an IMS network; and (3) it supports both a UE with ICS capability and an existing UE without ICS capability.

FIG. 1 is an illustration of an application scenario of session paths of the IMS centralized service, and it comprises the following network elements:

101: a User Equipment (UE);
102: a Visited Mobile Switch Center (VMSC);
103: a Home Subscriber Server (HSS);
104: a Media Gateway Control Function (MGCF);
105: a Media Gateway (MGW);
106: an IMS CS Control Function (ICCF);
107: a Call Session Control Function (CSCF);
108: a Telecom Application Server (TAS); and
109: a GSM Service Control Function (gsmSCF).

There are three paths between the UE 101 and the ICCF 106 to be established: a session control path, a bearer control path and a bearer path.

Wherein, the session control path comprises the following two modes:

(1) The CS session control path: which is in a CS domain and uses Unstructured Supplementary Service Data (USSD), and this path is via the VMSC 102 and the HSS 103;

(2) The PS session control path: which is in a PS domain and uses a Session Initiation Protocol (SIP) signaling, and the path is via the CSCF 107.

In the bearer control path, the UE 101 accesses to the VMSC 102 using standard CS control signaling and accesses to the IMS through the MGCF 104, and reaches the ICCF 106 through the CSCF 107.

In the bearer path, the UE 101 accesses to the IMS through the VMSC 102 and the MGW 105 and establishes a media connection with a remote UE of the session.

The IMS centralized services utilize the session control path between the UE 101 and the ICCF 106 to exchanges the session control message, and establish and control media bearer through the bearer control path, where the ICCF 106 acts as a User Agent (UA) of the IMS to access to the IMS on behalf of the UE.

The TAS 108 is the telecom application server in the IMS, and the basic telecom services are implemented in the TAS 108.

The function of the gsmSCF 109 is: when the VMSC triggers the mobile intelligent services (CAMEL, Customized Applications for Mobile network Enhanced Logic) to the gsmSCF 109, the gsmSCF 109 distributes the services request to the ICCF 106 according to the service information.

To date, there are mainly the following types of call forwarding in CS:

1) Call forwarding on unreachable

It is divided into the forwarding on phone powered off and the forwarding on no paging response and all incoming calls which call the UE are forwarded to a preset number.

2) Call forwarding on busy

The Call forwarding on busy is divided into forwarding on network-determined user busy and forwarding on user-determined user busy. Wherein, in the forwarding on network-determined user busy, when a UE is in a call, the other incoming calls are automatically forwarded to the preset number; in the forwarding on user-determined user busy, when a called user rings, the called user sends the user-busy message to the VMSC 102 depending on personal willingness thereof, and the VMSC 102 triggers the forwarding according to the message.

3) Call forwarding on no answer

When the phone is powered on and the incoming call is connected but is not answered, then the incoming call is automatically forwarded to another number preset.

4) Call forwarding unconditional

All phone numbers that call the UE are forwarded to another number preset.

In the CS domain, the forwarding service can be classified into the early forwarding and late forwarding, wherein, the early forwarding is that when acquiring the called user's roaming number, the home location register sends the forwarding message to the gateway mobile switch center to let the gateway mobile switch center trigger the forwarding service, such as the call forwarding on no conditions, call forwarding on phone powered off; while the late forwarding is that the call connects to the VMSC 102, but the call forwarding service is still triggered due to the call release by the user, such as the above call forwarding on busy, the call forwarding on no paging response, and the call forwarding on no reply etc.

In the present IMS centralized service, there is no complete solution for the forwarding on user-determined user busy, the forwarding on no paging response and the call forwarding on no reply etc.

Content of the Invention

The present invention provides a late call forwarding method in the IMS centralized service to overcome the shortcoming of the prior art and implement the late call forwarding on the basis of the network structure of the present IMS centralized service.

In order to solve the above problem, the present invention provides a late call forwarding method in an IP multimedia subsystem centralized service (ICS), and the method comprises the following steps of:

A1, during a call, an internet protocol multimedia subsystem circuit switch control function (ICCF) receiving a call request from a call session control function (CSCF) serving a called user, and the call being referred to as session A; the ICCF acquiring a called user's roaming number and initiates a call, being referred to as session B, to the called user;

A2, after receiving a call request of the session B, a visited mobile switch center (VMSC) serving the called user determining that a status of the called user satisfies conditions for triggering late call forwarding and the called user subscribes a late call forwarding service has the Originating-CAMEL Subscription Information (O-CSI) for the called user, then the VMSC triggering the late call forwarding service and triggers an intelligent service when initiating a call to a forwarding target; and A3: said VMSC exchanging messages with said ICCF to inform said ICCF about session associated information and a forwarding reason, and when said ICCF determines that the forwarding is needed, said ICCF sending a response including corresponding indication to the session A or does not sending a response depending on the forwarding reason, and said CSCF relaying the indication to a telecom application server (TAS), and the TAS initiating a regular forwarding service.

Furthermore, in the step A2, said conditions for triggering said late call forwarding comprises call forwarding on user-determined user busy, call forwarding on no paging response or call forwarding on no answer.

Furthermore, in the step A3, said VMSC exchanging the intelligent service message with said ICCF comprises the following steps of:

A311. said VMSC sending the intelligent service message including the session associated information and the forwarding reason to the global system for mobile communications service control function (gsmSCF), and said gsmSCF forwarding the message to said ICCF; and A312. after said ICCF determining that the message relates with the sessions A and B according to the session associated information in the received intelligent service message, said ICCF determining that the forwarding is needed and then sending a customized applications for mobile network enhanced logic (CAMEL) failure message to said VMSC, and the failure message reaching said VMSC via said gsmSCF.

Furthermore, in the step A3, said VMSC exchanging the intelligent service message with said ICCF comprises the following steps of:

A321. said VMSC sending the intelligent service message including the session associated information and the forwarding reason to the gsmSCF, and said gsmSCF forwarding the message to said ICCF;

A322. after said ICCF determining that the message associates with the sessions A and B according to the session associated information in the received intelligent service message, said ICCF allocating a temporary IMS routing number (IMRN) and associating the IMRN with said sessions A and B, storing the forwarding reason, and then returning the IMRN to said VMSC through CAMEL connection message, and said CAMEL connection message reaching said VMSC via said gsmSCF;

A323. after receiving the CAMEL connection message, said VMSC taking said IMRN as a called number to initiate a session C;

A324. after receiving a call request for the session C, said ICCF determining that the session C associates with the sessions A and B according to said IMRN and that the forwarding is needed, then sending the response message to CSCF in the session A including corresponding indication.

Furthermore, in the step A311 or A321, said intelligent service message including the session associated information and the forwarding reason is an Initial Detection Point (IDP) message.

Furthermore, said forwarding reason is indicated in a field of the called number or a forwarding reason in said IDP message.

Furthermore, said session associated information is a calling number or an original called number in the IDP message; alternatively, said session associated information is the calling number and the original called number in the IDP message.

Furthermore, step A3 applies the following way to release the session B:

After determining that the received intelligent service message associates with the sessions A and B, said ICCF releasing the session B;

Alternatively, after receiving a customized applications for mobile network enhanced logic (CAMEL) failure message from said ICCF, said VMSC releasing the session B;

Alternatively, after said ICCF determines that the received intelligent service message associates with the sessions A and B, said ICCF releasing the session B; meanwhile, after said VMSC receives the CAMEL failure message from said ICCF, said VMSC also releasing the session B.

Furthermore, the step A3 applies the following way to release the sessions B and C:

After determining that the session C associates with the sessions A and B, said ICCF releasing the sessions B and C;

Alternatively, after said ICCF determines that the session C associates with the sessions A and B, said ICCF releasing one of the sessions B and C, and after said VMSC receives the release message, said VMSC releasing the other session;

Alternatively, after said ICCF determines that the session C associates with the sessions A and B, said ICCF releasing the sessions C and B; and after said VMSC receives a first arriving releasing message of either of the sessions C and B, said VMSC releasing the other session. Furthermore, in the step A3, when the forwarding reason is call forwarding on no answer, said ICCF returns a corresponding session initiation protocol (SIP) failure response message in the session A, and after said TAS receives the message, said TAS initiates a call forwarding on no answer service according to said SIP failure response message; alternatively, said ICCF does not send any response message to the TAS, and the TAS waits for an expiration and triggers the call forwarding on no answer;

Alternatively, if the forwarding reason is a call forwarding on user-determined user busy or call forwarding on no paging response, said ICCF returns a corresponding SIP failure response message to the session A, and after said TAS receives the message, said TAS initiates the call forwarding on user-determined user busy or the call forwarding on no paging response according to the SIP failure response message.

Furthermore, in the step A2, when the called user registers in a circuit switching domain, subscription data of the called user which includes late call forwarding service and the O-CSI are downloaded to said VMSC, and said VMSC triggers said late call forwarding service and the intelligent service according to the subscription data and the status of the called user.

The technical effects of the present invention are as follows:

1. The present invention provides a method for implementing the late call forwarding in the IMS centralized service to implement the late call forwarding with a relatively simple message interaction process based on the present network architecture and the communication standard.

2. The present invention sends the forwarding reason to the IMS domain through the method of the calling intelligent service to control the late call forwarding service in the IMS domain, thus achieve the IMS centralized service control of the late call forwarding.

PREFERRED EMBODIMENTS OF THE PRESENT INVENTION

The present invention provides a solution for the late call forwarding in the ICS, and the solution does not consider the scenario on network-determined user busy since this scenario can be directly determined and triggered by the TAS.

In the present invention, the called user (UE-B) subscribes the late call forwarding service in the CS domain and O-CSI. When the user registers in the CS domain, the subscription data of the late call forwarding service and the O-CSI are downloaded to the VMSC.

The technical scheme of the present invention will be described in detail in the following in conjunction with the accompanying figures and the preferred embodiments, and the embodiments of FIG. 2 and FIG. 3 comply with this process.

Figure 1:
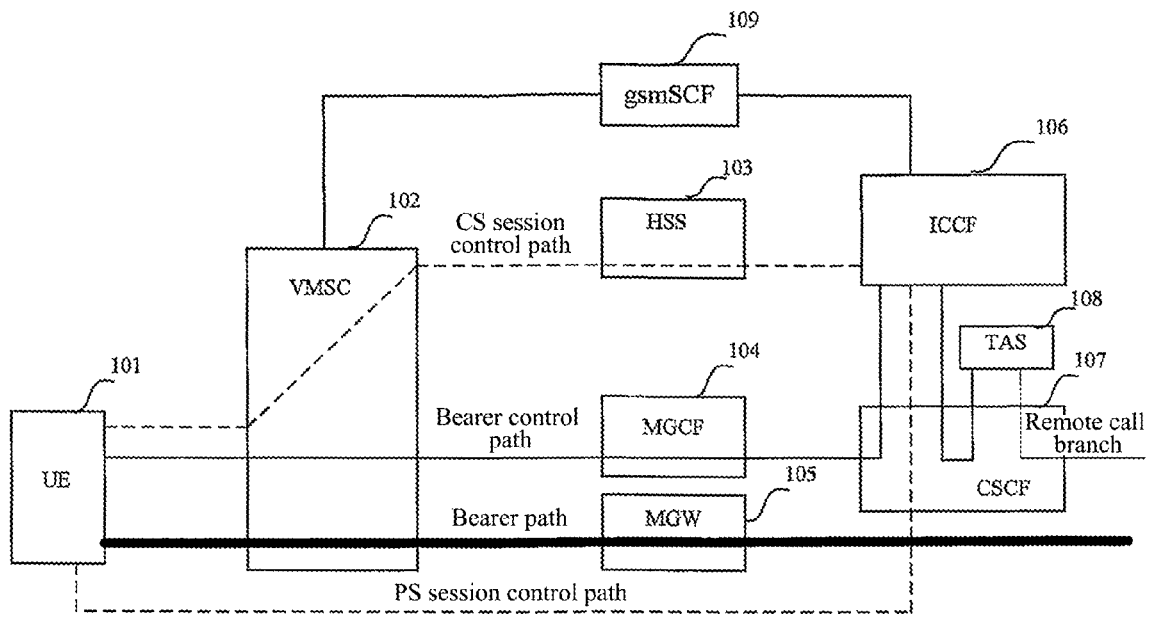
FIG. 1 is an illustration of the session path in an application scenario of the IMS centralized service in the prior art.
Figure 2:
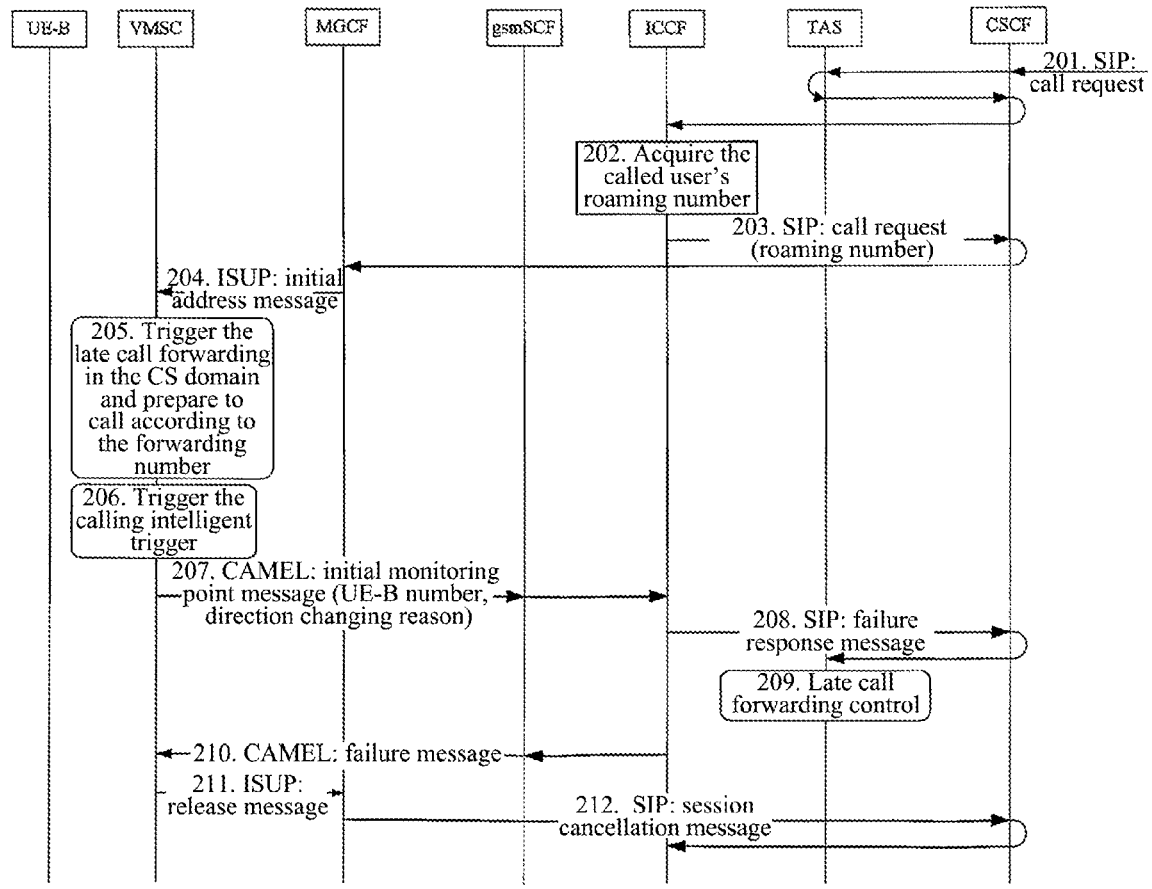
FIG. 2 is a flow chart of implementing the late call forwarding through the ICS service in accordance with the first embodiment of the present invention.

FIG. 2 is a flow chart of implementing the late call forwarding in the ICS service. When the CSCF serving the called user receives a call request, it sends the call request to the ICCF via the TAS according to the initial filter criterion. The ICCF acquires the called user's roaming number and then initiates a call to the called user, and the call reaches the VMSC. The VMSC triggers the late call forwarding service if the current status of the called user satisfies conditions of the late call forwarding, initiates a call to the forwarding target, triggers the calling CAMEL service and sends the CAMEL message to the ICCF; after the ICCF determines that the forwarding is needed, it translates the message into the SIP indication message and sends it to the TAS, and the TAS triggers the late call forwarding service according to the SIP indication message.

The detailed process is shown as follows:

S201, the CSCF serving the called user receives a SIP call request from the calling side, and after the call request is processed by TAS according to an initial filter criterion, the CSCF sends it to the ICCF, the session received by the ICCF is referred to as session A.

S202, the ICCF here works as the B2BUA (Back to Back User Agent), and it acquires the UE-B's roaming number first.

S203, the ICCF continues to establish the session according to the UE-B's roaming number by sending a SIP call request message, which carries the roaming number, to the MGCF via the CSCF, the session being referred to as session B.

S204, the MGCF sends an integrated services digital network user part (ISUP) initial address message to the VMSC serving the UE-B.

S205, after the VMSC receives the ISUP initial address message, it determines that the current status of the UE-B satisfies conditions of late call forwarding and triggers the late call forwarding, and then the VMSC initiates a call to the forwarding number according to the user subscription data.

S206, when the VMSC initiates a call, the calling CAMEL service of the UE-B is triggered.

This call only performs the first part of the process of setting up the call to trigger the calling CAMEL service. Since the UE-B subscribes the calling CAMEL service, so the VMSC has the calling CAMEL service data of the calling user.

S207, the VMSC sends a CAMEL IDP message including the session associated information (might be the original called number (UE-B number), the calling number, or both of them) and the forwarding reason to the gsmSCF, and the gsmSCF forwards the IDP message to the ICCF.

Wherein, the forwarding reason may be forwarding reason in the CAMEL IDP message or can be determined according to the particular called number.

S208, the ICCF determines that it associates with the session A received in S201 according to the session associated information in the CAMEL IDP message and returns a corresponding SIP failure response message to the session A according to the forwarding reason, and the message reaches the TAS via the CSCF.

Here, if the ICCF finds out that it is the call forwarding on no answer, it may not send any response message to the TAS, and the TAS triggers the call forwarding on no answer when the time for the session expires.

S209, the TAS triggers a regular late call forwarding service according to the SIP failure response message.

S210, the ICCF sends a CAMEL failure message to the VMSC, and the CAMEL failure message reaches the VMSC via the gsmSCF.

S211, the VMSC releases the session B received in S204 and sends an ISUP release message to the MGCF.

S212, the MGCF sends a SIP session cancellation message to the ICCF via the CSCF, and the ICCF releases the session B after receiving the message.

It should be noted that there is no order for S210 and S208, and they can be processed in parallel.

There are many ways to release the session between the ICCF and the VMSC after S207, and the above embodiment just applies one of them; another one is that the ICCF releasing the session B after S207; still another one is that the ICCF and the VMSC release the session respectively, in which the ICCF deletes the session established in S203 and S204 after S207 and the VMSC deletes the session established in S203 and S204 after receiving the message in S210, and this method is more reliable.

It should be noted that the above forwarding reason may be the called number field in the CAMEL IDP message. For example, different particular late call forwarding number in the CS domain is used as the identifier of the forwarding reason, and the particular late call forwarding number is filled into the called number field in the CAMEL IDP message according to the forwarding reason during the late call forwarding. Moreover, the forwarding reason may be the forward reason field in the CAMEL initial Detection point message.

Figure 3:
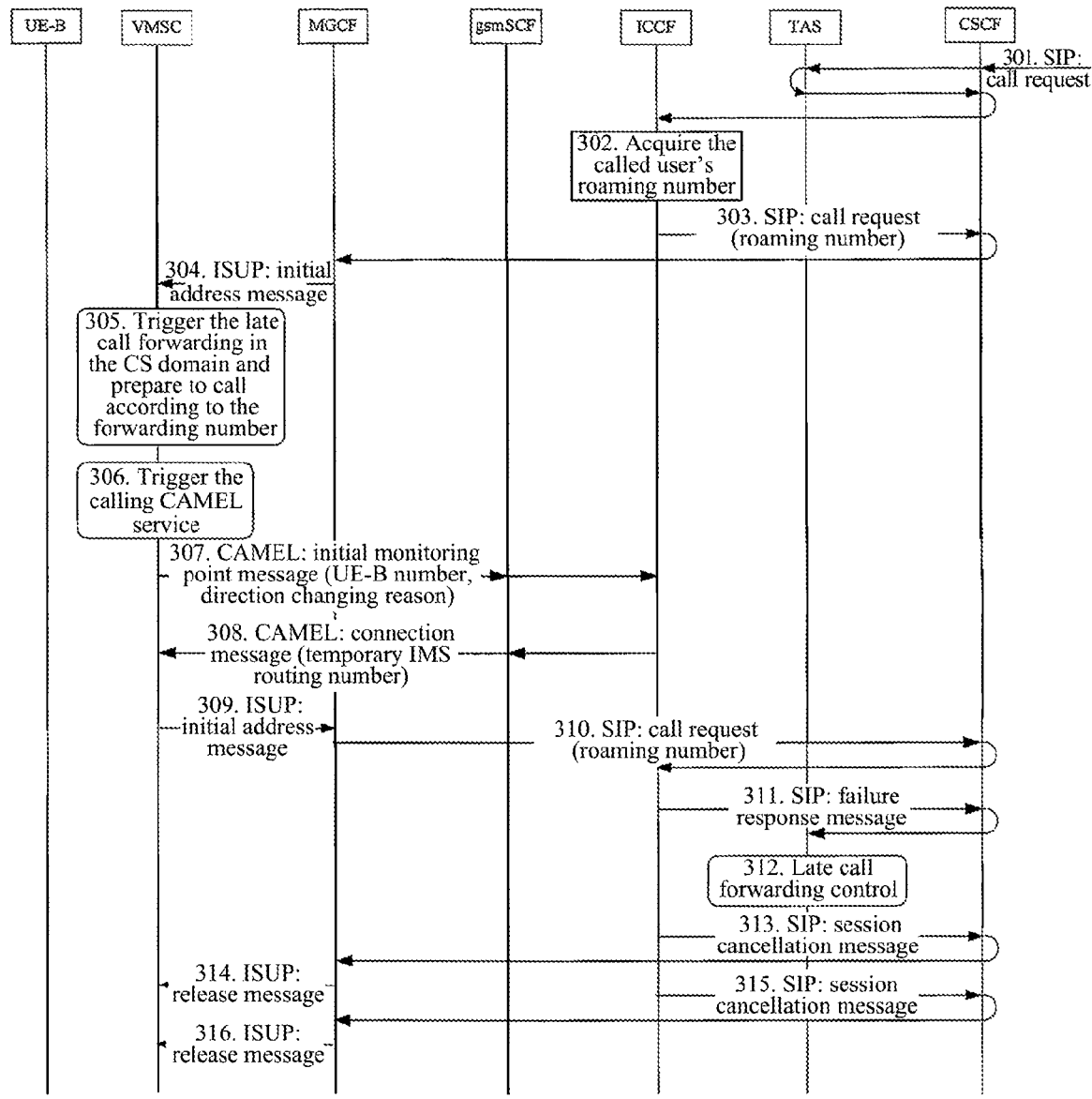
FIG. 3 is a flow chart of implementing the late call forwarding through the ICS service in accordance with the second embodiment of the present invention.

FIG. 3 is a flow chart of implementing the late call forwarding through the ICS service in accordance with the second embodiment. When a call request arrives at the CSCF serving the called user, the CSCF sends the call request to the ICCF via the TAS according to the initial filter criterion. The ICCF acquires the called user's roaming number and then initiates a call to the called user, and the call reaches the VMSC. If the current status of the called user satisfies the condition for triggering the late call forwarding, the VMSC initiates a call to the forwarding target, triggers the calling CAMEL service and sends the CAMEL message to the ICCF; after the ICCF determines that the forwarding is needed, it store the forwarding reason and allocates a temporary IMS routing number (IMRN). The ICCF returns the IMRN to the VMSC through the CAMEL connection message. The VMSC uses the IMRN to initiate a call, and after the call reaches the ICCF, the ICCF acquires the forwarding reason according to the association, and translates it to the indication in corresponding SIP message and sends it to the TAS, and the TAS triggers the late call forwarding service according to the SIP indication message.

The detailed process is shown as follows:

S301, the CSCF serving the called user receives the SIP call request from the calling side, and after the SIP call request is processed by the TAS according to the initial filter criterion, the CSCF sends it to the ICCF, the session received by the ICCF is referred to as session A.

S302, the ICCF here works as the B2BUA (Back to Back User Agent), and it acquires the UE-B's roaming number first.

S303, the ICCF continues to establish the session according to the UE-B's roaming number and sends a SIP call request message to the MGCF, and the call is referred to as the session B, the SIP carrying the roaming number reaches the MGCF via the CSCF.

S304, the MGCF sends an ISUP initial address message to the VMSC serving the UE-B.

S305, if the current state of the UE-B satisfies the condition for triggering the late call forwarding in the VMSC, the late call forwarding of the UE-B is triggered, and the VMSC initiates a call to the forwarding number according to the user subscription data.

S306, when the VMSC initiates a call, since the VMSC has calling CAMEL service data, the calling CAMEL service of the UE-B is triggered.

S307, the VMSC sends a CAMEL initial monitoring point message including the session association information (might be the original called number (UE-B number), the calling number, or both of them) and the forwarding reason to the gsmSCF, and the gsmSCF forwards the message to the ICCF.

Wherein, the forwarding reason may be the forward reason in the CAMEL initial monitoring point message or may be determined according to the specific called number.

S308, the ICCF determines that it associates with the session in S303 and S301 according to session associated information in the CAMEL IDP message. The ICCF allocates a temporary IMS routing number (IMRN) to associate it with the sessions in S303 and S301, and stores the forwarding reason. The ICCF returns the IMRN to the VMSC through the CAMEL connection message, and the message reaches the VMSC via the gsmSCF.

S309, after the VMSC receives the CAMEL connection message, it sends an ISUP initial address message according to the IMRN in the message, and the called number is the received IMRN, and the message reaches the MGCF first.

S310, the MGCF sends an SIP call request message to the ICCF, and the call is referred to as the session C, and the called number is the temporary IMS routing number, and the SIP call request message reaches the ICCF via the CSCF.

S311, the ICCF determines that it associates with the session in S301 and S303 according to the IMRN in the received SIP call request message. The ICCF returns a corresponding SIP failure response message to the session A received in S301 according to the stored forwarding reason, and the message reaches the TAS via the CSCF.

Similarly, if the ICCF finds out that here it is the call forwarding on no answer, it will not send any response message to the TAS, and the TAS triggers the call forwarding on no answer when the timer for the session expires.

S312, the TAS triggers the late call forwarding service according to the SIP failure response message.

S313, the ICCF cancels the session B established in S303, and sends a SIP cancellation message to the MGCF via the CSCF.

S314, the MGCF sends an ISUP release message to the VMSC, and the VMSC releases the session B after receiving the message.

S315, the ICCF cancels the session C established in S310, and sends an SIP cancellation message to the MGCF via the CSCF.

S316, the MGCF sends an ISUP release message to the VMSC, and the VMSC releases the session C after receiving the message.

It should be noted that there is no order for S311, S313 and S315, and they can be processed in parallel.

There are many ways to release the two sessions between the ICCF and the UE-B after S310, wherein, one of the two sessions is established in S303 and S304, and the other one in S309 and S310, the second embodiment just applies one of the ways; another one is that the ICCF releases any one of the sessions after S310, and the VMSC releases the other session after receiving the release message to enhance the reliability. Moreover, even if the ICCF releases the two sessions between the UE-B and itself, the VMSC can also releases the other session after receiving the message of releasing the first session, thus further enhance the reliability.

The above forwarding reason can be the called number field in the CAMEL IDP message. For example, a different particular late call forwarding number in the CS domain is used as the identifiers of the forwarding reasons, and the particular late call forwarding number is filled into the called number field in the CAMEL IDP message during the late call forwarding. Moreover, the forwarding reason may also be the forwarding reason field in the CAMEL IDP message.

Of course that this present invention may have several other embodiments, and without departing from the spirit and essence of the present invention, those skilled in the field can make all kinds of modification or variations in accordance with the present invention which should belong to the scope of the claims of the present invention.

Industrial Applicability

The present invention implements the late call forwarding with a relatively simple message exchanging process based on the existing network architecture and the communication standard and sends the forwarding reason to the IMS domain by using the calling intelligent service to control the late call forwarding services in the IMS domain, thus achieve the IMS centralized service control of the late call forwarding.

What we claim is:

1. A late call forwarding method comprising, in an internet protocol multimedia subsystem centralized service (ICS):

A1, during a call setting up, an internet protocol multimedia subsystem circuit switch control function (ICCF) receiving a call request from a call session control function (CSCF) serving a called user which registers in a Circuit Switching (CS) domain, the call being referred to as session A; the ICCF acquiring a called user's roaming number and initiating a call, being referred to as session B, to the called user;

A2, after receiving a call request of the session B, a visited mobile switch center (VMSC) serving the called user determining that a late call forwarding is needed according to a status of the called user and the called user subscribes a late call forwarding service in the CS domain and the VSMC has calling customized application for mobile network enhanced logic (CAMEL) service data for the called user, then initiating a call to a forwarding target to trigger a calling CAMEL service; and A3: said VMSC exchanging CAMEL messages with said ICCF to inform said ICCF about session associated information and a forwarding reason of the late call forwarding, and when said ICCF determines that the forwarding is needed, said ICCF sending a forwarding indication to the CSCF in response to the session A or not responding to the session A depending on the forwarding reason, and said CSCF forwarding the forwarding indication to a telecom application server (TAS), and the TAS initiating a regular forwarding service according to the received forwarding indication or triggering the call forwarding when receiving no response at an expiration, wherein the VMSC is in the CS domain, and the ICCF, CSCF and TAS are in an internet protocol multimedia subsystem.

2. A late call forwarding method of claim 1, wherein in the step A2, conditions for triggering said late call forwarding comprises forwarding on user-determined user busy, forwarding on no paging response or on no answer.

3. A late call forwarding method of claim 1, wherein in the step A3, said VMSC exchanging the CAMEL messages with said ICCF comprises the following steps of:

A311. said VMSC sending the CAMEL message including the session associated information and the forwarding reason to a global system for mobile communications service control function (gsmSCF), and said gsmSCF forwarding the messages to said ICCF; and A312. after said ICCF determining that the message relates with the sessions A and B according to the session associated information in the received CAMEL message, said ICCF sending a CAMEL failure message to said VMSC, the failure message reaching said VMSC via said gsmSCF.

4. A late call forwarding method of claim 1, wherein in the step A3, said VMSC exchanging the CAMEL messages with said ICCF comprises the following steps of:

A321. said VMSC sending a CAMEL initial monitoring point message including the session associated information and the forwarding reason to a global system for mobile communications service control function (gsmSCF), and said gsmSCF forwarding the CAMEL initial monitoring point message to said ICCF;

A322. after said ICCF determining that the CAMEL initial monitoring point message associates with the sessions A and B according to the session associated information in the received CAMEL message, said ICCF allocating a temporary internet protocol multimedia subsystem routing number (IMRN) and associating the IMRN with said sessions A and B, storing the forwarding reason, and then returning the IMRN to said VMSC through a CAMEL connection message, and said CAMEL connection message reaching said VMSC via said gsmSCF;

A323. after receiving the CAMAL connection message, said VMSC taking said IMRN as a called party number to initiate a call being referred to session C;

A324. after receiving the session C, said ICCF determining that the session C associates with the sessions A and B according to said IMRN and that the forwarding is needed, then sending said corresponding indication in the response message to said CSCF within the session A.

5. A late call forwarding method of claim 4, wherein in the step A323, when said VMSC takes said IMRN as the called party number to initiate the session C, said VMSC first sends an integrated services digital network user part (ISUP) initial address message which reaches a media gateway control function (MGCF) first; said MGCF sends a session initiation protocol (SIP) session request message to said ICCF, and the called party number is said IMRN, and said message reaches said ICCF via said CSCF, thereby said ICCF receives said session C.

6. A late call forwarding method of claim 3, wherein in the step A311, said CAMEL message including the session associated information and the forwarding reason is an Initial Detection Point (IDP) message.

7. A late call forwarding method of claim 6, wherein said forwarding reason is indicated in a field of the called party number or a forward reason in said IDP message.

8. A late call forwarding method of claim 6, wherein said session associated message is a calling party number or an original called party number in the IDP message; alternatively, said session associated message is the calling party number and the original called party number in the IDP message.

9. A late call forwarding method of claim 3, wherein the step A3 applies the following way to release the session B:

After determining that the received CAMEL message associates with the sessions A and B, said ICCF releasing the session B;

Alternatively, after receiving a customized applications for mobile network enhanced logic (CAMEL) failure message from said ICCF, said VMSC releasing the session B;

Alternatively, after said ICCF determines that the received CAMEL message associates with the sessions A and B, said ICCF releasing the session B; meanwhile, after said VMSC receives the CAMEL failure message from said ICCF, said VMSC also releasing the session B.

10. A late call forwarding method of claim 4, wherein the step A3 applies the following way to release the sessions B and C:

After determining that the session C associates with the sessions A and B, said ICCF releasing the sessions B and C;

Alternatively, after said ICCF determines that the session C associates with the sessions A and B, said ICCF releasing one of the sessions B and C, and after said VMSC receives the release message, said VMSC releasing the other session;

Alternatively, after said ICCF determines that the session C associates with the sessions A and B, said ICCF releasing the sessions C and B; and after said VMSC receives a first arriving release message of one of the sessions C and B, said VMSC releasing the other sessions.

11. A late call forwarding method of claim 2, wherein in the step A3, when the forwarding reason is call forwarding on no answer, said ICCF returns corresponding session initiation protocol (SIP) failure response message to the CSCF, and after said TAS receives the message, said TAS initiates a call forwarding on no answer service according to said SIP failure response message; alternatively, said ICCF does not send any response message to the TAS, and the TAS waits for an expiration and triggers the call forwarding on no answer;

Alternatively, if the forwarding reason is call forwarding on user-determined user busy or call forwarding on no paging response, said ICCF returns a corresponding SIP failure response message to the CSCF, and after said TAS receives the message, said TAS initiates the call forwarding on user-determined user busy or the call forwarding on no paging response according to the SIP failure response message.

12. A late call forwarding method of claim 1, wherein in the step A2, when the called user registers in a circuit switching domain, subscription data of the called user including late forwarding service data and the Originating-CAMEL Subscription Information(O-CSI) are downloaded to said VMSC, and said VMSC triggers said late call forwarding service and the CAMEL service according to the subscription data and the status of the called user.

13. A late call forwarding method of claim 4, wherein in the step A321, said CAMEL message including the session associated information and the forwarding reason is an Initial Detection Point (IDP) message.

* * * * *

UNITED STATES PATENT AND TRADEMARK OFFICE
CERTIFICATE OF CORRECTION

PATENT NO. : 8,289,887 B2  Page 1 of 1
APPLICATION NO. : 12/679739
DATED : October 16, 2012
INVENTOR(S) : Zhendong Liu et al.

It is certified that error appears in the above-identified patent and that said Letters Patent is hereby corrected as shown below:

Column 10, Line 8, Claim 4:

After "A323, after receiving the"
Delete "CAMAL" and
Insert -- CAMEL --.

Signed and Sealed this
Twenty-ninth Day of January, 2013

David J. Kappos
*Director of the United States Patent and Trademark Office*